United States Patent
Shi et al.

(10) Patent No.: US 10,784,731 B2
(45) Date of Patent: Sep. 22, 2020

(54) ROTOR STRUCTURE, MOTOR AND COMPRESSOR

(71) Applicant: GREE GREEN REFRIGERATION TECHNOLOGY CENTER CO., LTD. OF ZHUHAI, Zhuhai (CN)

(72) Inventors: Jinfei Shi, Zhuhai (CN); Man Wu, Zhuhai (CN); Zeyin Mi, Zhuhai (CN); Yong Xiao, Zhuhai (CN)

(73) Assignee: GREE GREEN REFRIGERATION TECHNOLOGY CENTER CO., LTD. OF ZHUHAI, Zhuhai (CN)

( * ) Notice: Subject to any disclaimer, the term of this patent is extended or adjusted under 35 U.S.C. 154(b) by 0 days.

(21) Appl. No.: 16/329,323

(22) PCT Filed: Sep. 28, 2017

(86) PCT No.: PCT/CN2017/103886
§ 371 (c)(1),
(2) Date: Feb. 28, 2019

(87) PCT Pub. No.: WO2018/068651
PCT Pub. Date: Apr. 19, 2018

(65) Prior Publication Data
US 2019/0190332 A1    Jun. 20, 2019

(30) Foreign Application Priority Data
Oct. 13, 2016    (CN) .......................... 2016 1 0893546

(51) Int. Cl.
*H02K 1/27* (2006.01)
*H02K 1/32* (2006.01)

(52) U.S. Cl.
CPC ........... *H02K 1/276* (2013.01); *H02K 1/2753* (2013.01); *H02K 1/2766* (2013.01); *H02K 1/32* (2013.01); *H02K 2213/03* (2013.01)

(58) Field of Classification Search
CPC ........ H02K 1/30; H02K 1/2786; H02K 1/2753; H02K 5/04; H02K 9/02
(Continued)

(56) References Cited

U.S. PATENT DOCUMENTS

| 3,997,803 A | 12/1976 | Mishra |
| 2003/0178905 A1* | 9/2003 | Koharagi ............. H02K 1/2766 310/156.38 |

(Continued)

FOREIGN PATENT DOCUMENTS

| CN | 202374069 U | 8/2012 |
| CN | 203339916 U | 12/2013 |

(Continued)

OTHER PUBLICATIONS

International Search Report dated Jan. 5, 2018 in PCT/CN2017/103886, 2 pages.
(Continued)

*Primary Examiner* — Jose A Gonzalez Quinones
(74) *Attorney, Agent, or Firm* — Oblon, McClelland, Maier & Neustadt, L.L.P.

(57) ABSTRACT

A rotor structure includes a rotor core and magnetic steel sheets. A shaft hole fixedly connected to a rotary shaft and an even number of magnetic steel grooves are formed on the rotor core along a rotation axis thereof. The magnetic steel grooves are symmetrically distributed around a periphery of the shaft hole in the rotor core, and the magnetic steel sheets are correspondingly installed in the magnetic steel grooves on a one-to-one basis. First through grooves extending axially and depressed radially are symmetrically distributed and formed around an inner surface of the shaft hole of the rotor core. First circulation holes are enclosed between the first through grooves and an outer surface of the rotary shaft.

(Continued)

A motor includes a stator and the rotor structure arranged in an inner hole of the stator. A compressor includes the motor.

10 Claims, 6 Drawing Sheets

(58) Field of Classification Search
USPC .... 310/156.01, 261.1, 216.114, 400, 411, 61
See application file for complete search history.

(56) References Cited

U.S. PATENT DOCUMENTS

| | | | |
|---|---|---|---|
| 2008/0224558 A1* | 9/2008 | Ionel | H02K 1/2766 |
| | | | 310/156.57 |
| 2010/0314955 A1 | 12/2010 | Masuda et al. | |
| 2011/0081263 A1 | 4/2011 | Yoshino et al. | |
| 2011/0298319 A1 | 12/2011 | Chamberlin et al. | |
| 2015/0137632 A1* | 5/2015 | Takahashi | H02K 1/28 |
| | | | 310/54 |
| 2015/0137650 A1 | 5/2015 | Takahashi | |
| 2017/0264153 A1* | 9/2017 | Groschup | H02K 1/28 |

FOREIGN PATENT DOCUMENTS

| | | |
|---|---|---|
| CN | 203730322 U | 7/2014 |
| CN | 104539072 A | 4/2015 |
| CN | 204497872 U | 7/2015 |
| CN | 105490417 A | 4/2016 |
| CN | 105553143 A | 5/2016 |
| CN | 106451849 A | 2/2017 |
| JP | 2006-77634 A | 3/2006 |
| JP | 2015-53831 A | 3/2015 |
| KR | 10-2011-0058057 A | 6/2011 |

OTHER PUBLICATIONS

Chinese Office Action dated Apr. 27, 2018 in Patent Application No. 201610893546.3, citing documents, 1 page.

Chinese Office Action dated Oct. 8, 2018 in Patent Application No. 201610893546.3, 7 pages.

The extended European search report dated May 27, 2020 in corresponding European Patent Application No. 17859698.7 (13 pages).

* cited by examiner

ROTOR STRUCTURE, MOTOR AND COMPRESSOR

RELATED APPLICATIONS

The disclosure claims the priority of Chinese patent application No. 201610893546.3 filed on Oct. 13, 2016 and entitled "ROTOR STRUCTURE, MOTOR AND COMPRESSOR", the entirety of which is incorporated herein as reference.

FIELD OF THE INVENTION

The disclosure relates to the technical field of motors, in particular to a rotor structure, a motor and a compressor.

BACKGROUND OF THE INVENTION

A permanent magnet motor drives loads under the action of electromagnetic induction of the magnetic field between a stator and a rotor. With rapid development of power electronics technology, microelectronics technology, new motor control theory and rare earth permanent magnet materials, the permanent magnet motor is rapidly popularized and applied. The motor mainly includes a stator and a rotor structure arranged in an inner hole of the stator. The stator is electrified externally, and the rotor rotates continuously under the action of the magnetic field generated by the stator.

In the operating process of the motor, as the iron loss of the motor results in redundant heat, accumulation of this part of heat will finally lead to damage to insulating components in the motor. To ensure normal operation of the motor, in Chinese patent document CN203730322U, a plurality of circulation holes axially passing through a rotor are formed on the rotor, which facilitate increasing the circulation area of refrigerant inside a housing and reducing the circulation resistance of refrigerant inside the compressor, so as to improve the whole circulation efficiency of the refrigerant and facilitate improving the refrigerating efficiency of an air conditioner. However, openings will influence the motor, for another example, in Chinese patent document CN204497872U, a plurality of air circulation holes are formed on the periphery of the inner hole of the rotor core so as to dissipate heat of the motor.

However, in some cases, the formed shaft hole of the rotor needs to be relatively large, or a plurality of magnetic steel sheets and the like need to be arranged, so that the opening space on the rotor core is limited. In such a limited space, no circulation hole could ensure the torque between the rotor and a rotary shaft, but will result in low whole circulation efficiency of refrigerant and oil of the compressor and low dissipated heat of the core of the motor. If the circulation holes are provided, the whole circulation efficiency of the refrigerant and oil of the compressor could be ensured, but the torque between a rotor and a rotary shaft is influenced to affect the operating performance of the motor.

SUMMARY OF THE INVENTION

Accordingly, the technical problem to be solved by the disclosure is that it is difficult to simultaneously ensure the whole circulation efficiency of refrigerant and oil of a compressor and the torque between a rotor and a rotary shaft when the opening space of a rotor core is limited.

To this end, the disclosure discloses a rotor structure, including:

a rotor core on which a shaft hole connected to a rotary shaft and an even number of at least two magnetic steel grooves are formed along a rotation axis thereof, wherein the magnetic steel grooves are symmetrically distributed around a periphery of the shaft hole in the rotor core;

magnetic steel sheets correspondingly installed in the magnetic steel grooves on a one-to-one basis; and wherein at least two first through grooves extending axially and depressed radially are symmetrically distributed and formed around an inner surface of the shaft hole on the rotor core, and first circulation holes are enclosed between the first through grooves and an outer surface of the rotary shaft.

Preferably, in the rotor structure, bosses corresponding to the first through grooves on a one-to-one basis are formed on the outer surface of the rotary shaft in a protruding manner, and the bosses are inserted at the openings of the first through grooves in a one-to-one corresponding manner.

Further preferably, in the rotor structure, six second circulation holes are symmetrically arranged at positions on the rotor core between the outer edge of the rotor core and the magnetic steel grooves, correspondingly, the number of the magnetic steel grooves is also six, the second circulation holes extend along the axial direction of the rotor core and are radially distributed on the center line of the magnetic pole of the rotor;

the size of the second circulation holes meets the followings:

$2*\delta \le m \le 4*\delta,\ 8*\delta \le n \le 14*\delta,\ 2*\delta \le L \le 4*\delta;$ wherein $\delta$ is the width of an air gap between the stator and the rotor; m is a first distance between the outer edge of the second circulation hole and the outer edge of the rotor core along the radial direction of the rotor core; n is a second distance between the inner edge of the second circulation hole and the bottom of the edge of the side of the magnetic steel grooves away from the shaft hole along the radial direction of the rotor core; and L is the minimum width of the second circulation hole.

Further preferably, in the rotor structure, two magnetic steel sheets with the same polarity and symmetrically distributed are arranged in each of the magnetic steel grooves, and the magnetic steel sheets in the two adjacent magnetic steel grooves have opposite polarities; and limit components arranged on the rotor core and configured to define the magnetic steel sheets in the magnetic steel grooves.

More preferably, in the rotor structure, the limit component includes two baffles respectively installed on two ends of the rotor core, and each of the baffles is provided with a third communication hole, a second through groove and a center hole respectively corresponding to the second circulation hole, the first through groove and the shaft hole on a one-to-one basis; and the rotary shaft passes through the shaft hole and the center hole and is fixed to the rotor core.

Further preferably, in the rotor structure, the limit component further includes at least three projections formed on the inner surfaces of the magnetic steel grooves in a protruding manner, and an installation space for installation of one of the magnetic steel sheets is formed between at least two projections along the radial direction of the rotor core.

Further preferably, in the rotor structure, the magnetic steel groove includes a V-shaped groove, an opening of the V-shaped groove faces away from the shaft hole, and the bottom of the V-shaped groove close to the shaft hole is a linear portion;

two of the magnetic steel sheets are respectively installed on two inclined portions of the V-shaped groove, and the projection is formed on inner surfaces of the linear portion and inner surfaces at ends of the opening of the V-shaped groove.

Preferably, in the rotor structure, the shape of the transverse section of the first circulation hole includes at least one of a rectangle, a trapezoid or a semicircle; and/or the shape of the transverse section of the second circulation hole includes at least one of a rectangle, a trapezoid or a prolate ellipse.

The disclosure discloses a motor, including a stator and a rotor structure arranged in the inner hole of the stator, the rotor structure being any one of the rotor structures described above.

The disclosure discloses a compressor including the motor as mentioned above.

The technical solution provided by the disclosure has at least one of the following advantages.

1. the disclosure discloses a rotor structure, including: a rotor core on which a shaft hole connected to a rotary shaft and an even number of at least two magnetic steel grooves are formed along a rotation axis thereof, wherein the magnetic steel grooves are symmetrically distributed around a periphery of the shaft hole in the rotor core; magnetic steel sheets correspondingly installed in the magnetic steel grooves on a one-to-one basis; and wherein at least two first through grooves extending axially and depressed radially are symmetrically distributed and formed around an inner surface of the shaft hole on the rotor core, and first circulation holes are enclosed between the first through grooves and an outer surface of the rotary shaft.

In the rotor structure, the first through grooves are formed around an inner surface of the shaft hole and depressed inward; no matter whether the rotor core is provided with an opening space thereon, when the rotary shaft is fixed in the shaft hole, first circulation holes are enclosed between the first through grooves and an outer surface of the rotary shaft. Compared with the prior art, the first circulation holes are directly formed on the shaft hole of the rotor core and the first circulation holes serve as a part of the shaft hole, so that the circulation area of the rotor can be increased, the whole circulation efficiency of the refrigerant and oil is accelerated, and heat dissipation of the motor and the rotary shaft is facilitated. Moreover, stationary fit between the rotary shaft and the first through grooves ensures the torque between the rotor and the rotary shaft, therefore the circulation area of the rotor is increased without disadvantageous influence of the operating performance of the motor.

2. In the rotor structure provided by the disclosure, bosses corresponding to the first through grooves on a one-to-one basis are formed on the outer surface of the periphery of the rotary shaft, the bosses are inserted at the openings of the first through grooves in a one-to-one corresponding manner to ensure fixed connection of the rotary shaft and the rotor core, so that the rotor and the rotary shaft rotate synchronously; further, the torque between the stator and the rotor is ensured.

3. In the rotor structure provided by the disclosure, six second circulation holes are symmetrically arranged at positions between the outer edge of the rotor core and the magnetic steel grooves, correspondingly, the number of the magnetic steel grooves is also six, the second circulation holes extend along the axial direction of the rotor core and are radially distributed on the center line of the magnetic pole of the rotor and/or symmetrically distributed on two sides of the center line of the magnetic pole of the rotor; the size of the second circulation holes meets the following conditions: $2*\delta \leq m \leq 4*\delta$, $8*\delta \leq n \leq 14\delta$, $2*\delta \leq L \leq 4*\delta$; in which $\delta$ s the width of an air gap between the stator and the rotor; m is a first distance between the outer edge of the second circulation hole and the outer edge of the rotor core along the radial direction of the rotor core; n is a second distance between the inner edge of the second circulation hole and the bottom of the edge of the side of the magnetic steel grooves away from the shaft hole along the radial direction of the rotor core; and L is the minimum width of the second circulation hole.

In the rotor structure, the rotor core is further provided with second circulation holes thereon, which further increase the circulation area of the rotor, reduce the temperature rise of the rotor core, and further improve the while circulation efficiency of the refrigerant and oil. Moreover, if the position and the size of the second circulation holes meet the above conditions, the second circulation holes could change the direction of the magnetic field on the rotor core, thereby changing the cogging effect of the stator, so as to reduce the tangential ripple of the rotor, reduce the torque ripple of the motor, and reduce the noise generated when the motor is operating.

4. In the rotor structure provided by the disclosure, two magnetic steel sheets with the same polarity and symmetrically distributed are arranged in each magnetic steel groove, and the magnetic steel sheets in two adjacent magnetic steel grooves have opposite polarities; the rotor structure further includes limit components arranged on the rotor core and configured to define the magnetic steel sheets in the magnetic steel grooves. Two magnetic steel sheets with the same polarity are arranged in one magnetic steel groove to improve the magnetic field intensity of the rotor, meanwhile, the limit components are arranged to prevent axial and/or radial displacement vibration of the magnetic steel sheets installed in the magnetic steel grooves, thereby ensuring the reliability of the operation of the motor.

5. In the rotor structure provided by the disclosure, the limit component includes two baffles respectively installed on two ends of the rotor core, and each of the baffles is provided with a third communication hole, a second through groove and a center hole respectively corresponding to the second circulation hole, the first through groove and the shaft hole on a one-to-one basis; and the rotary shaft passes through the shaft hole and the center hole so as to be fixed to the rotor core. The baffles arranged on the two ends of the rotor core define the magnetic steel sheets in a limit space formed by the magnetic steel grooves and the two baffles to prevent the magnetic steel sheets from axially slipping off from the magnetic steel grooves.

6. In the rotor structure provided by the disclosure, the limit component further includes at least three projections formed on the inner surfaces of the magnetic steel grooves in a protruding manner, and an installation space for installation of one of the magnetic steel sheets is formed between at least two projections along the radial direction of the rotor core. The projections are arranged to limit the radial positions of the magnetic steel sheets in the magnetic steel grooves, the projections and the baffles are coordinatively used to limit the radial and axial positions of the magnetic steel sheets in the magnetic steel grooves, and the magnetic steel sheets are stationary in the magnetic steel grooves.

7. In the rotor structure provided by the disclosure, the magnetic steel groove is a V-shaped groove, an opening of the V-shaped groove faces away from the shaft hole, and the bottom of the V-shaped groove close to the shaft hole is a linear portion; two of the magnetic steel sheets are respectively installed on two inclined portions of the V-shaped groove, and the projections are formed on the inner surface of the linear portion and the inner surface at the opening of the V-shaped groove. The magnetic steel grooves are designed into V-shaped grooves, so that the center line of the magnetic pole of the rotor is located on the center line of the two symmetrical V-shaped grooves; and the second circulation holes formed on the center line of the magnetic pole, so that the second circulation holes have better effect on reduction of the torque ripple of the motor and further reduce the noise generated during the operation of the motor.

8. In the rotor structure provided by the disclosure, the shape of the transverse section of the first circulation hole is at least one of a rectangle, a trapezoid or a semicircle; and/or the shape of the transverse section of the second circulation hole is at least one of a rectangle, a trapezoid or a prolate ellipse. It is convenient to manufacture the first circulation holes and the second circulation holes on the rotor core, so that the processing and manufacturing of the rotor structure are simplified.

9. The motor provided by the disclosure includes a stator and a rotor structure arranged in the inner hole of the stator, the rotor structure being any one of the rotor structures above. The motor of this structure uses the above rotor structure to increase the circulation area of the rotor in the motor, accelerate the heat dissipation speed of the core of the motor, ensure the torque between the rotor and the rotary shaft, reduce the torque ripple of the motor, and reduce the noise generated by vibration during operation of the motor.

10. The compressor provided by the disclosure includes the motor, the motor being the motor described above. The compressor is provided with this structure to increase the circulation area of refrigerant and oil of the compressor on the rotor core, improve the whole circulation efficiency of the refrigerant and oil of the compressor, ensure the torque between the rotor and the rotary shaft, reduce the torque ripple of the motor, reduce the noise resulted from vibration during operation of the motor, and improve the service lives of the motor and the compressor.

BRIEF DESCRIPTION OF THE DRAWINGS

In order to more clearly illustrate the specific embodiments of the disclosure or the technical solutions in the prior art, the drawings used in the specific embodiments or the description of the prior art will be briefly described below. Obviously, the drawings in the following description are some embodiments of the disclosure, and other drawings may be obtained from the drawings by those of ordinary skill in the art without creative efforts.

Reference signs: 1—rotor core; 11—shaft hole; 12—magnetic steel grooves; 121—projection; 2—magnetic steel sheets; 3—second circulation hole; 4—first through groove; 5—rotary shaft; 51—boss; 6—baffle; 61—third circulation hole; 62—second through groove; 63—center hole; 7—rivet.

DETAILED DESCRIPTION OF THE EMBODIMENTS

The technical solutions of the disclosure will be clearly and completely described below with reference to the accompanying drawings. Obviously, the described embodiments are a part of the embodiments, not all of them. All other embodiments obtained by those of ordinary skill in the art based on the embodiments in the disclosure without creative work are within the protection scope of the disclosure.

In the description of the disclosure, it should be noted that the orientation or position relationships indicated by terms "center", "upper", "lower", "left", "right", "vertical", "horizontal", "inner", "outer" and the like are the orientation or position relationships shown on the basis of the drawings, merely for the purposes of conveniently describing the disclosure and simplifying the description, and they do not indicate or imply that the device or component referred to must have a specific orientation and constructed and operated in a specific orientation, so they cannot be understood as a limit to the disclosure.

In addition, the technical features described below and involved in different embodiments of the disclosure can be combined with each other as long as there are no conflicts between each other.

Embodiment 1

This embodiment provides a rotor structure, including a rotor core 1, a magnetic steel sheets 2 and a limit component.

Figure 1:
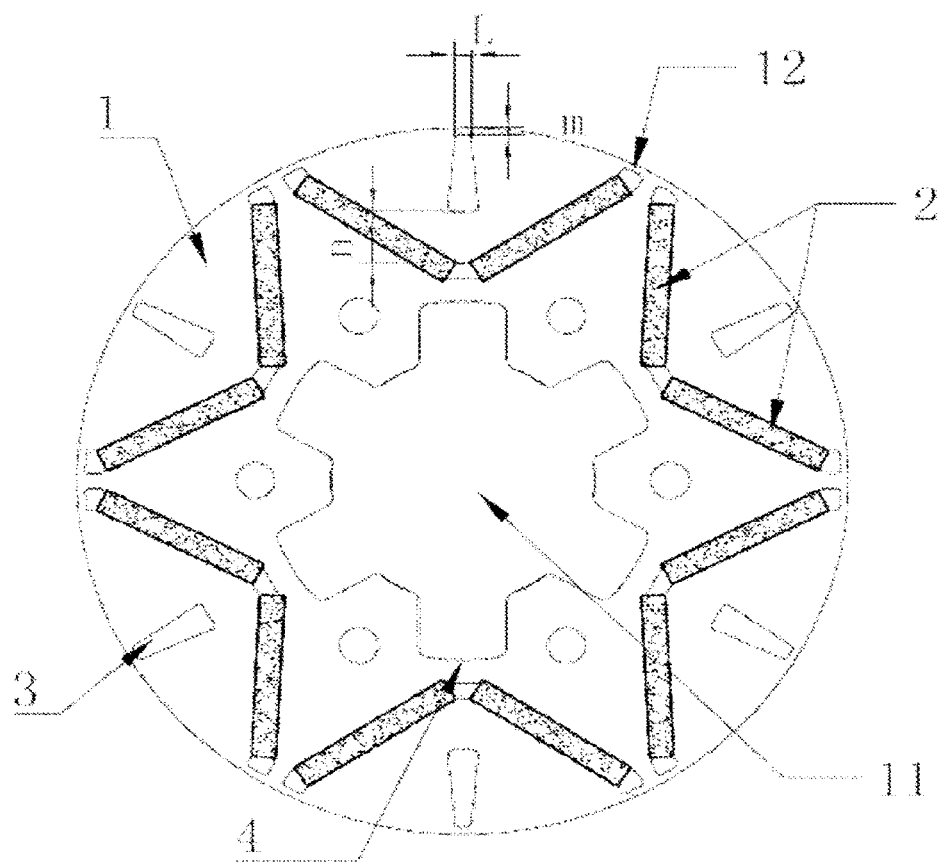
FIG. 1 is a diagrammatic cross section of a rotor core provided by embodiment 1 of the disclosure after installation of magnetic steel sheets.

As shown in FIG. 1, a shaft hole 11 fixedly connected to a rotary shaft 5 and six magnetic steel grooves 12 are formed on the rotor core 1 along a rotation axis of the rotor core 1, the magnetic steel grooves 12 are V-shaped grooves, the six V-shaped grooves are symmetrically distributed around a periphery of the shaft hole 11 in the rotor core 1, the opening of each V-shaped groove faces a side away from the shaft hole 11, and the bottom of the V-shaped groove close to the shaft hole 11 is a linear portion. Two magnetic steel sheets 2 with the same polarity and symmetrically distributed are arranged in each V-shaped groove, that is, two magnetic steel sheets 2 with the same polarity are respectively installed on two inclined portions of the V-shaped groove, the magnetic steel sheets 2 in the two adjacent magnetic steel grooves 12 have opposite polarities, for example, the S pole of the magnetic steel sheet 2 in one magnetic steel groove 12 faces the stator and the N pole thereof faces the shaft hole 11, while the N pole of the magnetic steel sheet 2 in an adjacent magnetic steel groove 12 faces the stator and the S pole thereof faces the shaft hole 11.

Figure 2:
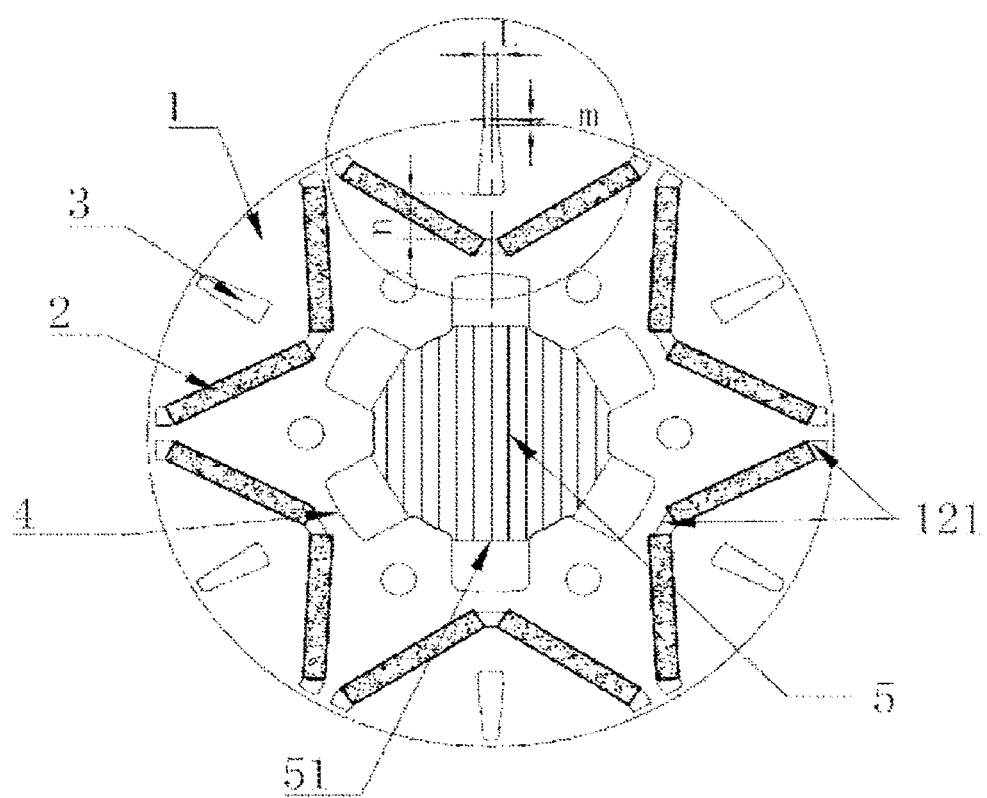
FIG. 2 is a structure diagram of the rotor core provided by embodiment 1 of the disclosure after installation of the magnetic steel sheets and a rotary shaft.
Figure 5:
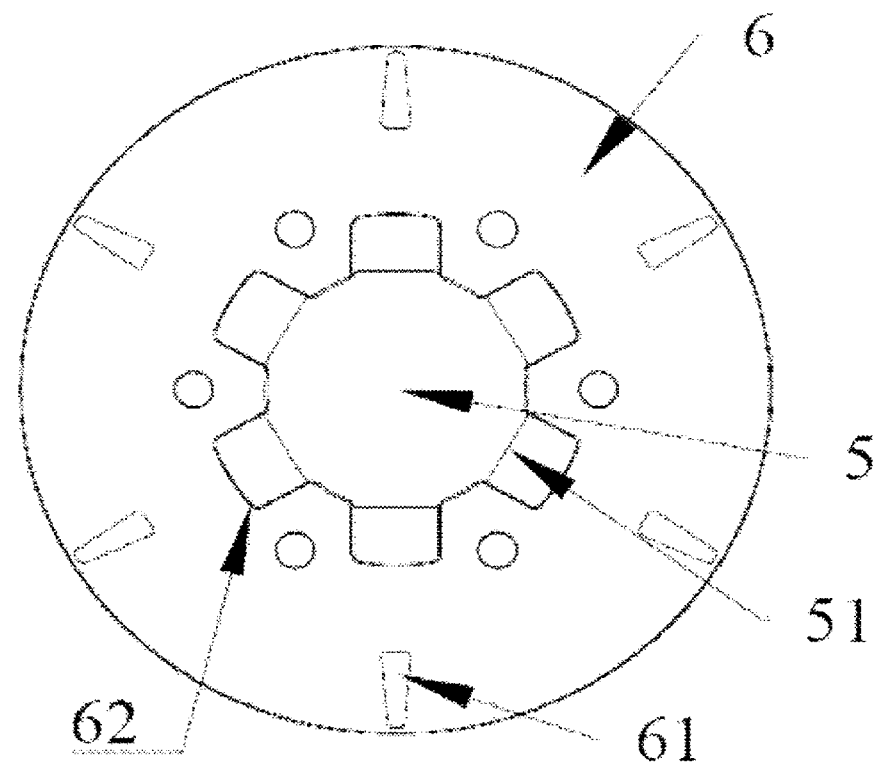
FIG. 5 is a top plan view of the rotor structure provided by embodiment 1 of the disclosure.

As shown in FIG. 2 and FIG. 5, six first through grooves 4 extending axially and depressed radially are formed around the inner surface of the shaft hole 11 on the rotor core 1, six bosses 51 corresponding to the first through groove 4 on a one-to-one basis are formed on the outer surface of the periphery of the rotary shaft 5 in a protruding manner, the six bosses 51 are respectively tightly inserted at the opening of one first through groove 4 by interference fit, for example, so that the rotary shaft 5 is fixedly connected with the rotor core 1. Moreover, the first circulation holes are enclosed between the first through grooves 4 and their corresponding bosses 51. Preferably, the shape of the transverse section of the first circulation hole is a rectangle.

Figure 3:
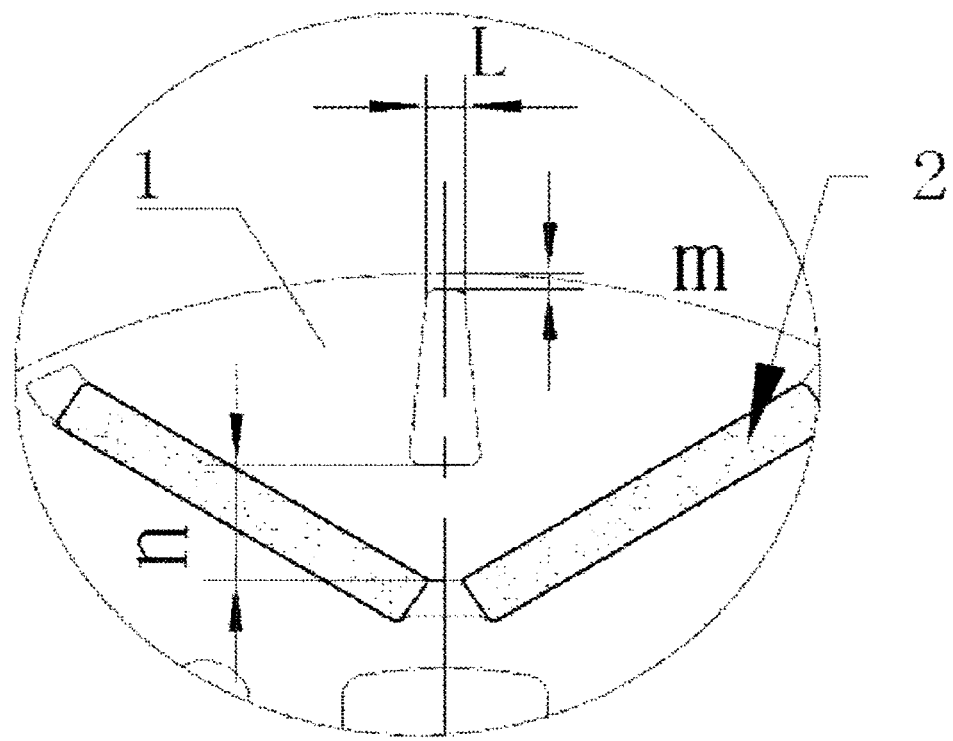
FIG. 3 is a partially enlarged schematic view in the circle in FIG. 2.

Moreover, six second circulation holes 3 are symmetrically arranged at positions on the rotor core 1 between the outer edge of the rotor core 1 and the magnetic steel grooves 12, and the second circulation hole 3 extending along the axial direction of the rotor core 1 and are radially distributed on the center line of the magnetic pole of the rotor. Preferably, the shape of the transverse section of the second circulation hole 3 is a trapezoid of which the short edge faces the stator and the long edge faces the shaft hole 11. The size of the second circulation holes 3 meets the following conditions:

$$2*\delta \leq m \leq 4*\delta,\ 8*\delta \leq n \leq 14*\delta,\ 2*\delta \leq L \leq 4*\delta;$$

in which δ is the width of an air gap between the stator and the rotor (the rotor is arranged in the inner hole of the stator); as shown in FIGS. 2 and 3, m is a first distance between the outer edge of the second circulation hole 3 and the outer edge of the rotor core 1 along the radial direction of the rotor core 1; n is a second distance between the inner edge of the second circulation hole 3 and the bottom of the edge of the side of the magnetic steel grooves 12 away from the shaft hole 11 along the radial direction of the rotor core 1; and L is the minimum width of the second circulation hole 3.

Figure 4:
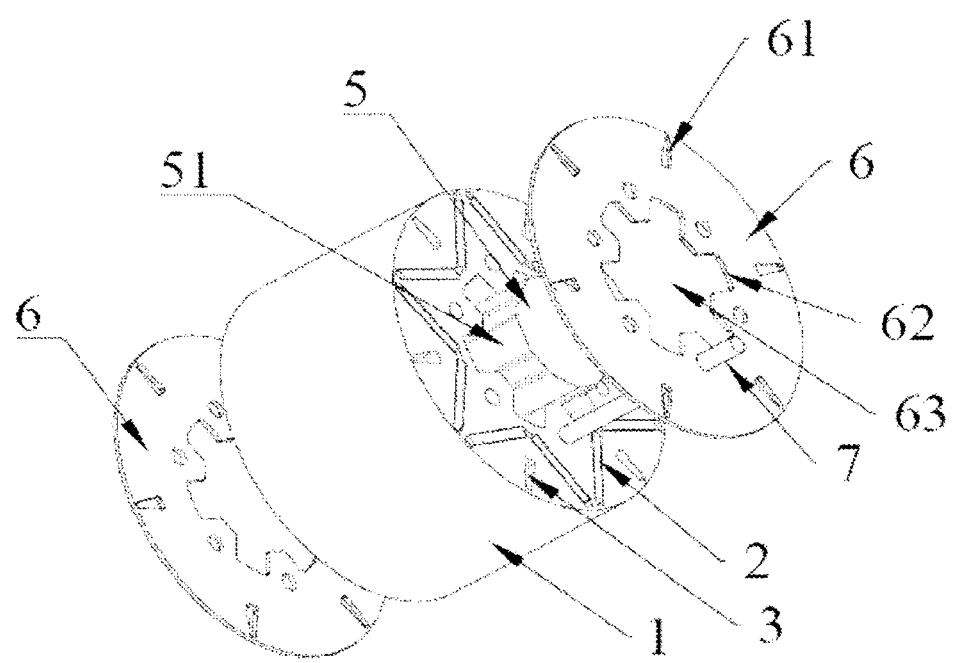
FIG. 4 is an exploded diagram of a rotor structure provided by embodiment 1 of the disclosure.

As shown in FIGS. 4 and 2, the limit component includes two baffles 6 and three projections 121, the two baffles 6 are respectively installed on two ends of the rotor core 1, and each baffle 6 is provided with a third communication hole 61, a second through groove 62 and a center hole 63 respectively corresponding to the second circulation hole 3, the first through groove 4 and the shaft hole 11 on a one-to-one basis; and the rotary shaft 5 passes through the shaft hole 11 and the center hole 63 so as to be fixed on the rotor core 1. The three projections 121 are respectively formed on the inner surface of the linear portion and the inner surface at the ends of the opening of the V-shaped groove, an installation space for installation of one magnetic steel sheet 2 is formed between two adjacent projections 121, the projections 121 limit the radial position of the magnetic steel sheets 2, the baffles 6 limit the magnetic steel sheets 2 in a limit space formed by the magnetic steel grooves 12 and the two baffles 6 so as to limit the axial positions of the magnetic steel sheets 2, so that the magnetic steel sheets 2 are in a stationary state at positions in the magnetic steel grooves 12 to prevent displacement vibration of the magnetic steel sheets 2 during operation of the motor and ensure the reliability of the operation of the motor.

In the rotor structure in this embodiment, the first through grooves 4 extending axially and depressed radially are formed on the inner surface of the shaft hole 11 of the rotor core 1; no matter whether the rotor core 1 is provided with an opening space thereon, when six bosses 51 on the outer surface of the rotary shaft 5 are correspondingly in interference fit at openings of the first through grooves 4 on a one-to-one basis, first circulation holes are always enclosed between the first through grooves 4 and the bosses of the rotary shaft 5. Compared with the prior art, the first circulation holes are formed on the shaft hole 11 of the rotor core 1 to serve as a part of the shaft hole 11 of the rotor core 1, and no first circulation hole needs to be formed on the rotor core 1 as in the prior art, thereby increasing the circulation area of the rotor, accelerating the whole circulation efficiency of the refrigerant and oil, and facilitating the heat dissipation of the motor and the rotary shaft 5. Meanwhile, interference fit between the rotary shaft 5 and the first through grooves 4 ensures that in the case that the contact area of the rotary shaft 5 and the inner surface of the shaft hole 11 is reduced, the shaft hole 11 of the rotor core 1 and the rotary shaft 5 have sufficient clasp force and tangent torque therebetween, so that the rotor and the rotary shaft 5 would not be loosened, the torque between the rotor and the rotary shaft 5 would be ensured, and thus the circulation area of the rotor will be increased while the operating performance of the motor is not be affected.

Figure 6:
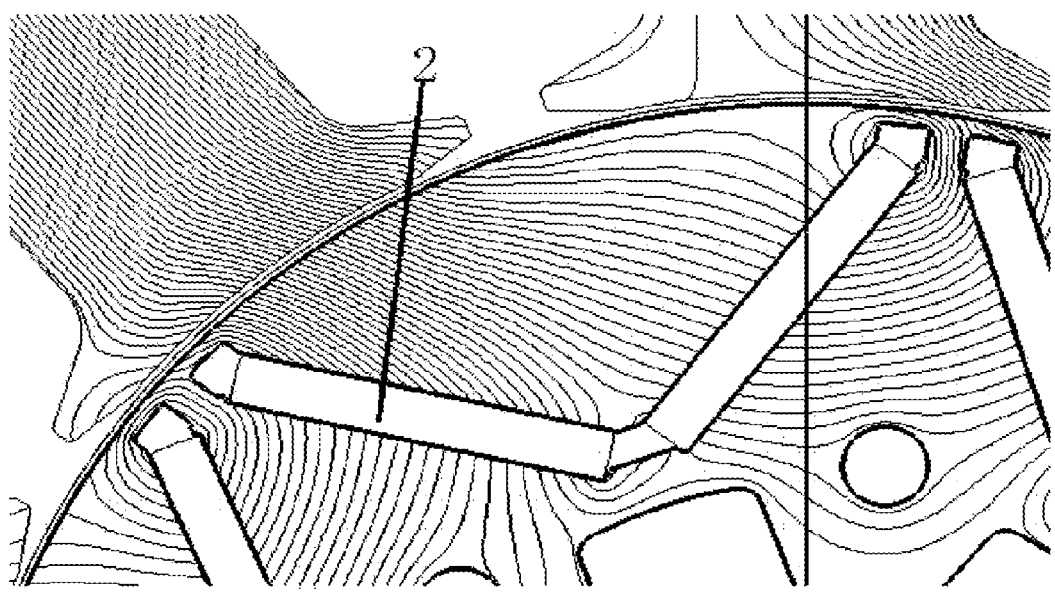
FIG. 6 is a schematic view showing the direction of the magnetic field of a rotor in a case that the rotor core in embodiment 1 of the disclosure is not provided with six second circulation holes thereon.
Figure 7:
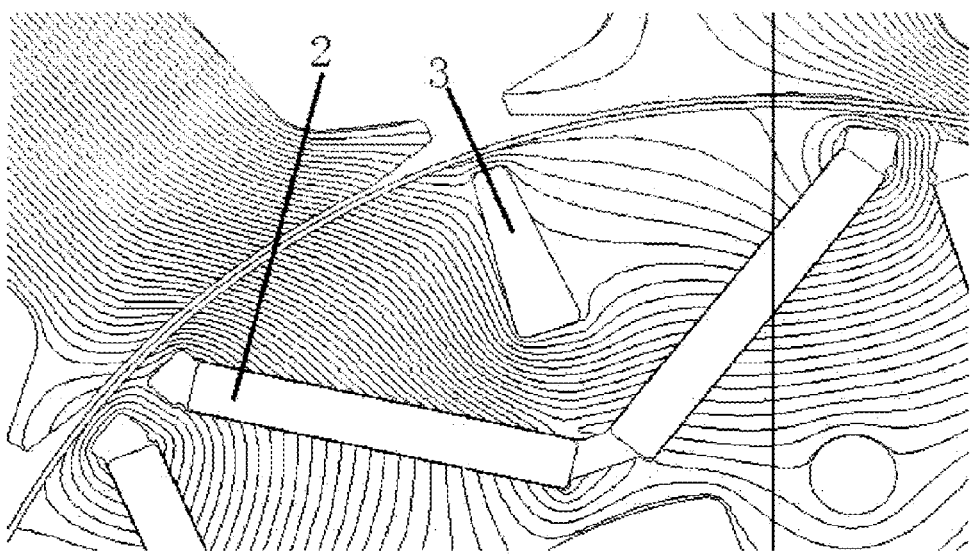
FIG. 7 is a schematic view showing the direction of the magnetic field of a rotor in a case that the rotor core in embodiment 1 of the disclosure is provided with six second circulation holes thereon.
Figure 8:
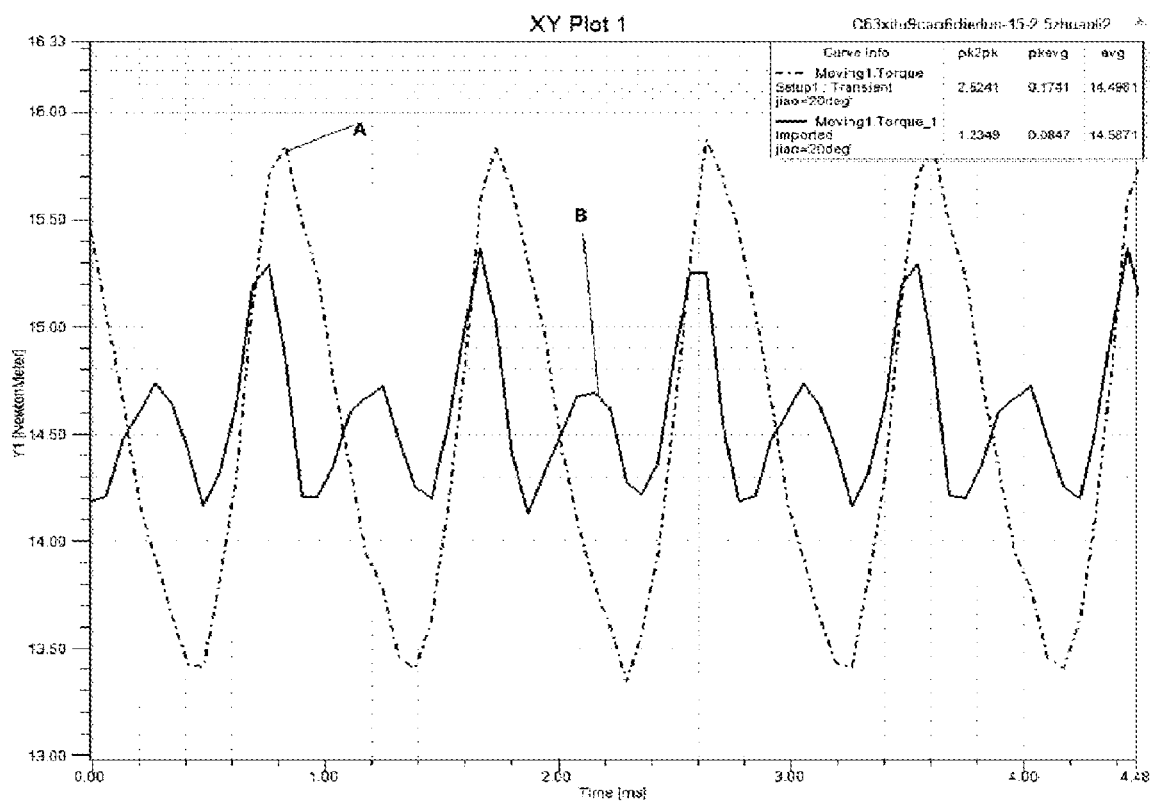
FIG. 8 is a comparison graph of the curve of a motor torque ripple in the case that the rotor core in embodiment 1 of the disclosure is not provided with six second circulation holes thereon vs. the curve of a motor torque ripple in the case that the rotor core in embodiment 1 of the disclosure is provided with six second circulation holes thereon (the abscissa is time, the ordinate is motor torque ripple)

Moreover, the second circulation holes 3 are formed on the rotor core 1 to further increase the circulation area of the rotor, reduce the temperature rise of the rotor core 1 and further improve the whole circulation efficiency of the refrigerant and oil. In addition, the second circulation holes 3 are located on the center line of the magnetic pole of the rotor. When the size of the second circulation holes 3 meets the above conditions, the second circulation holes 3 changes the direction of the magnetic field on the rotor core 1, as shown in FIGS. 6 and 7. FIG. 6 shows the direction of the magnetic field of the rotor in that case that no second circulation hole 3 is formed on the rotor core 1, and FIG. 7 shows the direction of the magnetic field of the rotor in the case that the six second circulation holes 3 are formed on the rotor core 1. As can be seen from the figures, the arrangement of the second circulation holes 3 changes the direction of the magnetic field of the rotor to change the cogging effect of the stator, thereby reducing the tangential ripple of the rotor, reducing the torque ripple of the motor, and reducing the noise generated during the operation of the motor. As shown in FIG. 8, the curve A in the figure shows the torque ripple of the motor in the case that no second circulation hole 3 is formed on the rotor core 1, and the curve B shows the torque ripple of the motor in the case that six second circulation holes 3 are formed on the rotor core 1. It can be seen from the figure that in the case that the second circulation holes 3 are formed, the torque ripple of the motor is reduced by more than half, so that the torque ripple of the motor is considerably reduced, and the noise resulted from vibration during the operation of the motor is considerably reduced to form the motor and the compressor in low noise.

It should be noted that the size of the second circulation holes 3 must meet the above conditions. If the size of the second circulation holes 3 does not fall within the above range, for example, if the size of the second circulation holes 3 is too large, the direction of the magnetic field of the rotor is changed too large, the magnetic density of the air gap will be reduced, the direction of the magnetic field will be offset to be out of the effective range of the magnetic field, and the output of the motor will be lowered, and the performance of the motor will be degraded. If the size of the second circulation hole 3 is too small, the direction of the magnetic field of the rotor cannot be considerably changed, the torque ripple of the motor will be not significantly reduced, the noise reduction effect cannot be obtained, and the circulation area of the rotor cannot be further increased.

As an alternative embodiment, in addition to the rectangle above, the shape of the transverse section of the first circulation hole may be a trapezoid or other shape.

As an alternative embodiment, in addition to the V-shaped groove above, the magnetic steel groove 12 may be a groove of other shapes, such as a U shape; two magnetic steel sheets 2 with the same polarities are arranged in the U-shaped groove, projections 121 are formed on the inner surface of the U-shaped magnetic steel groove 12 to radially limit the positions of the magnetic steel sheets 2; or the groove may be a magnetic steel groove 12 of other shapes.

As an alternative embodiment of the number of the projections 121, the number of projection 121 may also be four, five, six, seven and the like, as long as an installation space for installation of one magnetic steel sheets 2 can be formed between at least two projections 121 along the radial direction of the rotor core 1, and the projections 121 limit the radial positions of the magnetic steel sheets 2 in the magnetic steel grooves 12. It depends on the practical use condition as for how many projections 121 are specifically designed to limit the two ends of one magnetic steel sheet 2.

In the above embodiment, two magnetic steel sheets 2 with the same polarity and symmetrically distributed are arranged in each of the magnetic steel grooves 12. Since the magnetic steel sheets 2 in each of the magnetic steel grooves 12 have the same polarity, they are equivalent to one magnetic steel sheet 2. As an alternative embodiment, one magnetic steel sheet 2 can be arranged in each magnetic steel groove 12 whose shape conforms to that of the magnetic steel sheet 2, and the magnetic steel sheets 2 in the adjacent two magnetic steel grooves 12 have opposite polarities, that is, the magnetic steel sheets 2 are correspondingly installed in magnetic steel grooves 12 on a one-to-one basis.

As an alternative embodiment of the number of first through grooves 4, the number of first through grooves 4 may also be an even number, such as two, four, eight, ten, etc., and an even number of first through grooves 4 are symmetrically distributed on the inner surface of the shaft hole 11 of the rotor core 1. That is, the number of first through grooves 4 is at least two and an even number. Correspondingly, the number of the bosses 51 of the rotary shaft 5 is also at least two and an even number. Similarly, as an alternative embodiment of the numbers of the magnetic steel grooves 12 and the magnetic steel sheets 2, the number of magnetic steel grooves 12 may also be an even number, such as two, four, eight, ten, etc., and an even number of magnetic steel grooves 12 are symmetrically distributed on the rotor core 1. Correspondingly, the number of the magnetic steel sheets 2 is an even number, such as two, four, eight, ten, etc. However, when six second circulation holes 3 are formed on the rotor core 1, the number of the magnetic steel grooves 12 is correspondingly six, and only when each of the six magnetic steel grooves 12 respectively correspond to one second circulation hole 3, reduction of the torque ripple of the motor and the noise of the motor can be realized.

As an alternative embodiment of the limit component, the limit component may also include only two baffles 6, and the magnetic steel sheets 2 are inserted and fixed in the magnetic steel grooves 12, and no projections 121 is arranged to limit the radial direction of the magnetic steel sheets 2 in the magnetic steel grooves 12. Alternatively, other limit structures in the prior art are applied, and then only the magnetic steel sheets 2 need to be limited in the magnetic steel grooves 12. As a further alternative embodiment, the limit component may also not be formed, and then only the magnetic steel sheets 2 need to be fixed in the magnetic steel grooves 12. For example, the magnetic steel sheets 2 are bonded in the magnetic steel grooves 12, or other fixing methods in prior art may be applied, and then only the magnetic steel sheets 2 need to be in the magnetic steel grooves 12.

As a preferred embodiment of the size of the second circulation hole 3, for example, the air gap width $\delta$ is 0.3 mm, then the size of the corresponding second circulation hole 3 is in the following range: $0.6 \text{ mm} \leq m \leq 1.2 \text{ mm}$, $2.4 \text{ mm} \leq n \leq 4.2 \text{ mm}$, $0.6 \leq L \leq 1.2 \text{ mm}$. For example, m is 0.8 mm, n is 3 mm, L is 0.9 mm; or m is 0.6 mm, n is 2.4 mm, L is 0.6 mm; or m is 1.2 mm, n is 4.2 mm, L is 1.2 mm; or m is 1 mm, n is 3.6 mm, L is 0.75 mm; or the like. The size of the second circulation hole 3 would be determined according to the value of the air gap width $\delta$ between the stator and the rotor.

As an alternative embodiment, the shape of the transverse section of the second circulation hole 3 may also be a rectangle, a prolate ellipse, or other shapes, as long as it satisfies the above position and size requirements, and can reduce the torque ripple of the motor and increase the circulation area.

As an alternative embodiment, in the above embodiment, no second circulation holes 3 may be formed, and only the first through grooves 4 are formed; the first circulation holes are enclosed between the first through grooves 4 and the bosses 51 of the rotary shaft 5 to increase the circulation area of the refrigerant and oil on the rotor and improve the whole circulation efficiency of the refrigerant and oil. As a further alternative embodiment, no bosses 51 is formed on the outer surface of the rotary shaft 5, and the rotary shaft 5 is fixed in the shaft hole 11 in other fixing ways so as to be fixed on the rotor core 1, for example, the fixed shaft 5 is radially and fixedly connected to the shaft hole 11 by an anti-rotation connection member, and then the first circulation holes are enclosed between the first through groove 4 and the outer surface of the rotary shaft 5.

Moreover, in the above embodiment, preferably, the rotor core 1 is formed by stacking a plurality of rotor sheets, and the first through groove 4, the second circulation hole 3, the magnetic steel groove 12 and the installation hole are formed on each of the rotor sheets. Correspondingly, an installation hole is also formed on the baffle 6, and a fastener passes through the baffle 6 and the installation hole on the rotor stamped steel sheet to fix the baffle 6 and the plurality of rotor sheets so as to form the above rotor structure. For example, connection is realized by rivets 7, screws, or other connectors.

Embodiment 2

This embodiment provides a motor, including a stator and a rotor structure arranged in the inner hole of the stator, the rotor structure being any one of the rotor structures as provided in embodiment 1.

As the motor in this embodiment adopts the rotor structure in embodiment 1, the circulation area of the rotor in the motor is increased, the heat dissipation speed of the core of the motor is accelerated, the torque between the rotor and the rotary shaft 5 is ensured, the torque ripple of the motor is reduced, and the noise generated by vibration of the motor during operation is reduced.

Embodiment 3

This embodiment provides a compressor, including a motor, which is any of the motors as provided in embodiment 2.

As the compressor in this embodiment is provided with the motor as provided in embodiment 2, the circulation area of refrigerant and oil of the compressor on the rotor core 1 is increased, the whole circulation efficiency of the refrigerant and oil of the compressor is improved, meanwhile, the torque between the rotor and the rotary shaft 5 is also ensured, the torque ripple of the motor is reduced, the noise resulted from vibration during the operation of the motor is reduced, and the service lives of the compressor and the motor are prolonged.

It is apparent that the embodiments above are merely examples for the purpose of clear illustration and are not limit to the embodiments. For those of ordinary skill in related art, other different forms of changes or variations may be also made in light of the above illustration. There is no need and no way to exhaust all of the embodiments here. The obvious changes or variations derived therefrom are still within the protection scope of the disclosure creation.

The invention claimed is:

1. A rotor structure, comprising:
   a rotor core on which a shaft hole connected to a rotary shaft and an even number of at least two magnetic steel grooves are formed along a rotation axis thereof, wherein the magnetic steel grooves are symmetrically distributed around a periphery of the shaft hole in the rotor core;
   magnetic steel sheets correspondingly installed in the magnetic steel grooves on a one-to-one basis;
   limit components arranged on the rotor core and configured to define the magnetic steel sheets in the magnetic steel grooves; and
   at least two first through grooves extending axially and depressed radially and symmetrically distributed and formed around an inner surface of the shaft hole on the rotor core, and first circulation holes are enclosed between the first through grooves and an outer surface of the rotary shaft,
   wherein six second circulation holes are symmetrically arranged at positions on the rotor core between the outer edge of the rotor core and the magnetic steel grooves correspondingly, the number of the magnetic steel grooves is also six, the second circulation holes extend along the axial direction of the rotor core and are radially distributed on a center line of a magnetic pole of the rotor;
   the size of the second circulation holes meets the following:

$2*\delta \leq m \leq 4*\delta$, $8*\delta \leq n \leq 14*\delta$, $2*\delta \leq L \leq 4*\delta$;

wherein $\delta$ is the width of an air gap between the stator and the rotor; m is a first distance between the outer edge of the second circulation hole and the outer edge of the rotor core along the radial direction of the rotor core; n is a second distance between the inner edge of the second circulation hole and the bottom of the edge of the side of the magnetic steel grooves away from the shaft hole along the radial direction of the rotor core; and L is the minimum width of the second circulation hole;
   wherein the limit component comprises two baffles respectively installed on two ends of the rotor core, and each of the baffles is provided with a third communication hole, a second through groove and a center hole respectively corresponding to the second circulation hole, the first through groove and the shaft hole on a one-to-one basis; and
   wherein the rotary shaft passes through the shaft hole and the center hole and is fixed to the rotor core.

2. The rotor structure according to claim 1, wherein bosses corresponding to the first through grooves on a one-to-one basis are formed on the outer surface of the rotary shaft in a protruding manner, and the bosses are inserted at the openings of the first through grooves in a one-to-one corresponding manner.

3. The rotor structure according to claim 1, further comprising:
   two magnetic steel sheets with the same polarity and symmetrically distributed, the magnetic steel sheets being arranged in each of the magnetic steel grooves, and the magnetic steel sheets in the two adjacent magnetic steel grooves have opposite polarities.

4. The rotor structure according to claim 3, wherein the limit component further comprises at least three projections formed on the inner surfaces of the magnetic steel grooves in a protruding manner, and an installation space for installation of one of the magnetic steel sheets is formed between at least two projections along the radial direction of the rotor core.

5. The rotor structure according to claim 4, wherein the magnetic steel groove comprises a V-shaped groove, an opening of the V-shaped groove faces away from the shaft hole, and the bottom of the V-shaped groove close to the shaft hole is a linear portion; and
   wherein two of the magnetic steel sheets are respectively installed on two inclined portions of the V-shaped groove, and the projection is formed on inner surfaces of the linear portion and inner surfaces at ends of the opening of the V-shaped groove.

6. The rotor structure according to claim 1, wherein the shape of the transverse section of the first circulation hole comprises at least one of a rectangle, a trapezoid or a semicircle; and/or
   wherein the shape of the transverse section of the second circulation hole comprises at least one of a rectangle, a trapezoid or a prolate ellipse.

7. A motor, comprising:
   a stator; and
   the rotor structure according to claim 1,
   wherein the rotor structure is arranged in an inner hole of the stator.

8. A compressor, comprising the motor of claim 7.

9. The rotor structure according to claim 4, wherein the six second circulation holes and the magnetic steel grooves are symmetrically arranged at the positions on the rotor core such that each of the second circulation holes is positioned outside of a closest magnetic steel groove of the magnetic steel grooves with respect to a radial direction from the rotation axis of the rotor core.

10. The rotor structure according to claim 1, wherein the baffles do not include magnetic steel sheets positioned thereon.

* * * * *